(12) United States Patent
Grant et al.

(10) Patent No.: US 7,371,130 B1
(45) Date of Patent: May 13, 2008

(54) COAXIAL CABLE COVERING

(76) Inventors: Michael F. Grant, 1701 NW. 96th Ter., Apt. 1-G, Pembroke Pines, FL (US) 33024; Steve Mills, 1701 NW. 96th Ter., Apt. 1-G, Pembroke Pines, FL (US) 33024

( * ) Notice: Subject to any disclaimer, the term of this patent is extended or adjusted under 35 U.S.C. 154(b) by 0 days.

(21) Appl. No.: 11/465,448

(22) Filed: Aug. 17, 2006

(51) Int. Cl.
*H01R 9/22* (2006.01)

(52) U.S. Cl. ..................................... 439/719

(58) Field of Classification Search ............... 439/719, 439/536, 501, 4, 528, 578–585, 540.1, 49, 439/535; 174/66, 58, 50.53, 50, 53, 41, 59, 174/135
See application file for complete search history.

(56) References Cited

U.S. PATENT DOCUMENTS

| | | |
|---|---|---|
| D188,850 S | 9/1960 | Clark |
| 3,042,739 A * | 7/1962 | Craig ........................... 174/66 |
| 4,188,505 A | 2/1980 | O'Connor |
| 4,303,296 A | 12/1981 | Spaulding |
| 4,558,172 A * | 12/1985 | Zetena ......................... 174/66 |
| 5,002,502 A * | 3/1991 | Hill ............................. 439/536 |
| 5,183,967 A | 2/1993 | Lin |
| D375,082 S | 10/1996 | Messelhi |
| D478,871 S | 8/2003 | Beaton |
| 6,894,219 B2 * | 5/2005 | Culbertson ............... 174/50.53 |

* cited by examiner

*Primary Examiner*—Edwin A. Leon

(57) ABSTRACT

A coaxial cable covering apparatus includes a plate that has a first side, a second side and a peripheral edge. The plate has at least one mounting opening extending therethrough. A flange is attached to and is coextensive with the peripheral edge. The flange is angled with respect to a plane of the plate. The flange has an outer edge has a notch therein. The notch extends toward the peripheral edge of the plate. The first side of the plate has a trough therein aligned with the notch. The trough is elongated and a coaxial cable is positionable in the notch and extended along a portion of the trough. At least one fastener may be extending through the at least one mounting opening to secure the plate to a dwelling wall. The plate is positioned over an outlet to hold the coaxial cable flush with the dwelling wall.

5 Claims, 2 Drawing Sheets

COAXIAL CABLE COVERING

BACKGROUND OF THE INVENTION

1. Field of the Invention

The present invention relates to cable outlet and covering devices and more particularly pertains to a new cable outlet and covering device for holding a coaxial cable flush with a dwelling wall to prevent the coaxial cable from being snagged or caught by adjacent furniture or other articles.

2. Description of the Prior Art

The use of cable outlet and covering devices is known in the prior art. While these devices fulfill their respective, particular objectives and requirements, the need remains for a device that will hold a coaxial cable flush against a wall after it has been plugged into an outlet. This will provide a more clean appearance and will prevent the cable from interfering with adjacent pieces of furniture or items positioned on desks or tables.

SUMMARY OF THE INVENTION

The present invention meets the needs presented above by generally comprising a plate that has a first side, a second side and a peripheral edge. The plate has at least one mounting opening extending therethrough. A flange is attached to and is coextensive with the peripheral edge. The flange is angled with respect to a plane of the plate. The flange has an outer edge has a notch therein. The notch extends toward the peripheral edge of the plate. The first side of the plate has a trough therein aligned with the notch. A ridge is formed in the second side of plate to accommodate the trough. The trough is elongated and a coaxial cable is positionable in the notch and extended along a portion of the trough. At least one fastener may be extending through the at least one mounting opening to secure the plate to a dwelling wall. The plate is positioned over an outlet to hold the coaxial cable flush with the dwelling wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
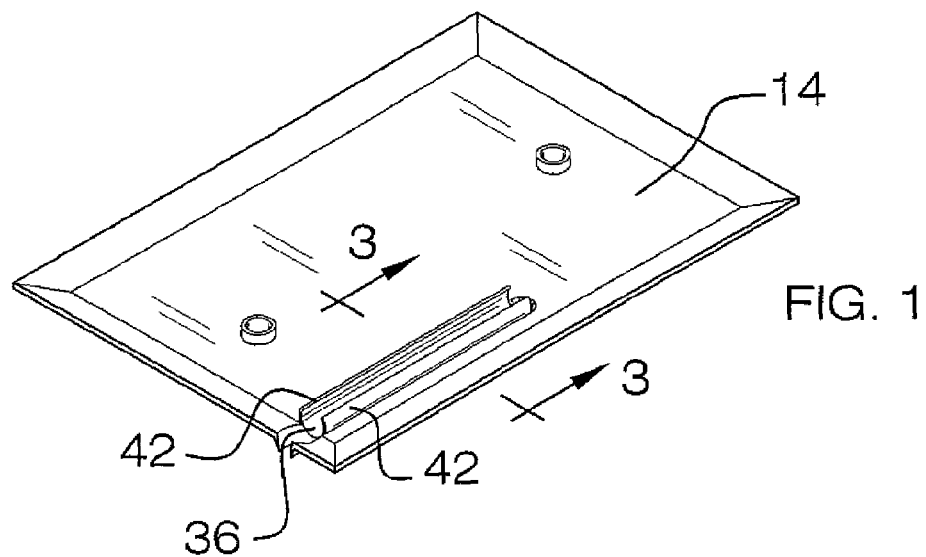
FIG. 1 is a rear perspective view of a coaxial cable covering apparatus according to the present invention.
Figure 2:
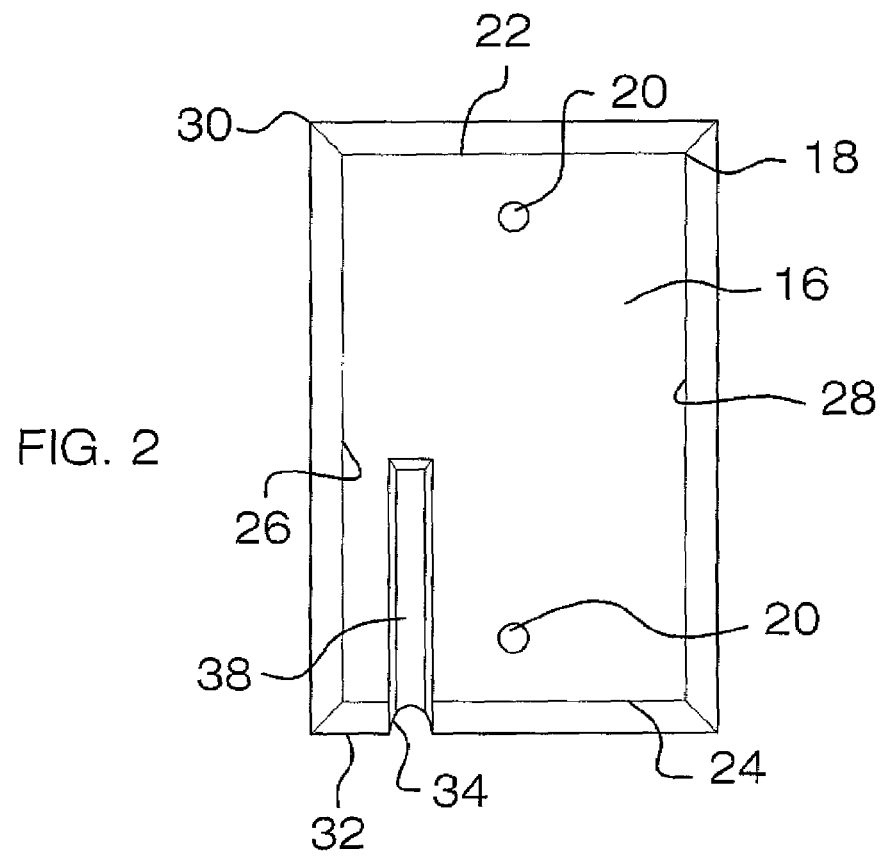
FIG. 2 is a front view of the present invention.
Figure 3:
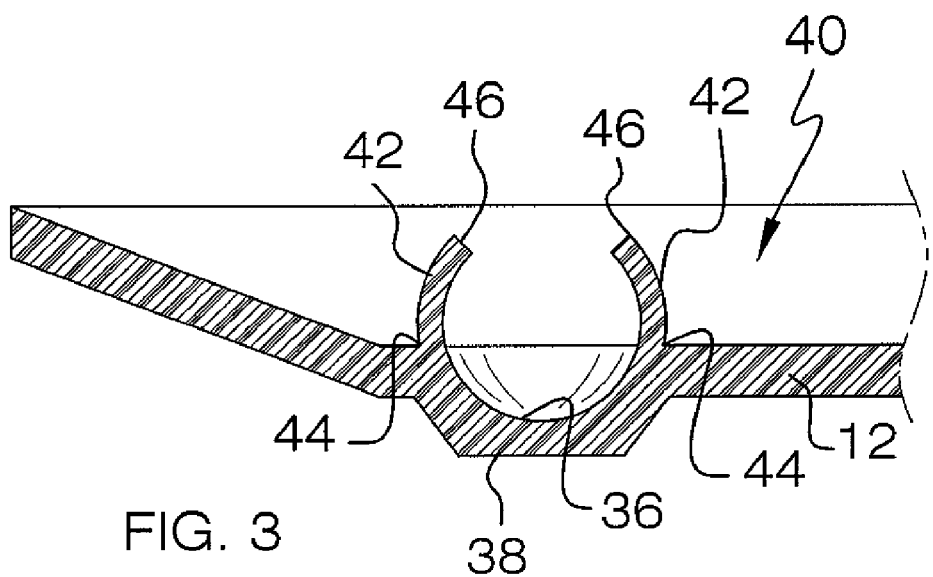
FIG. 3 is a cross-sectional view taken along line 3-3 of FIG. 1 of the present invention.
Figure 4:
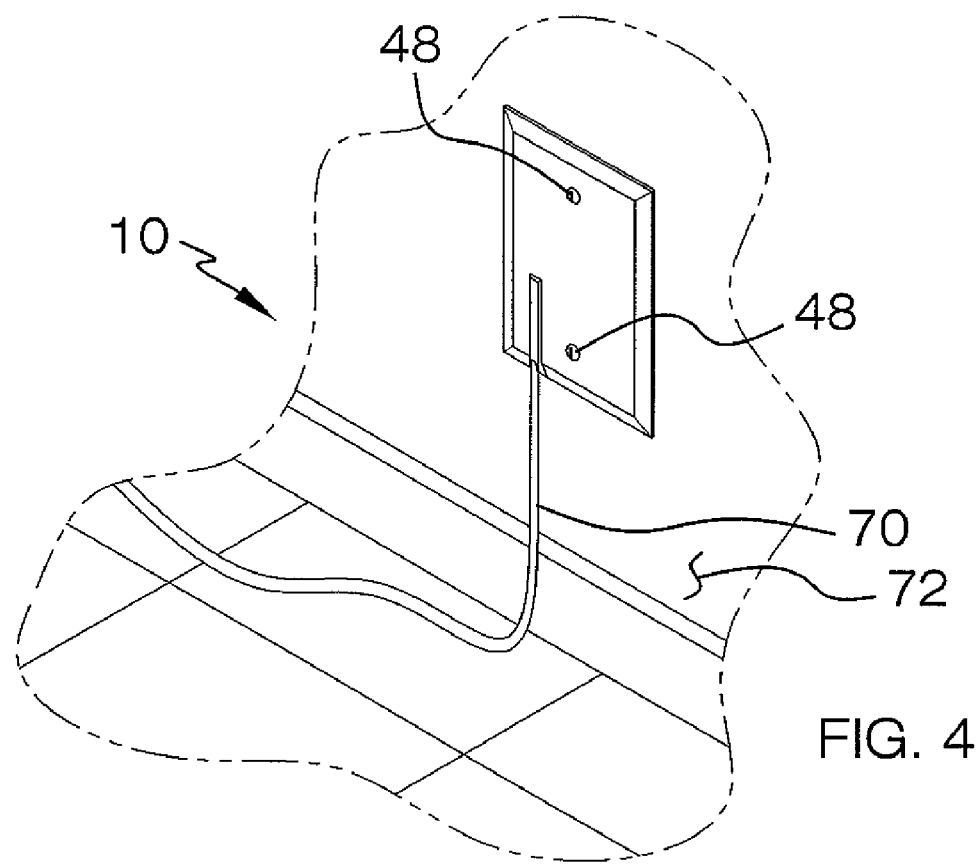
FIG. 4 is a front perspective in-use view of the present invention.

With reference now to the drawings, and in particular to FIGS. 1 through 4 thereof, a new cable outlet and covering device embodying the principles and concepts of the present invention and generally designated by the reference numeral 10 will be described.

As best illustrated in FIGS. 1 through 4, the coaxial cable 70 covering apparatus 10 generally comprises a plate 12 that has a first side 14, a second side 16 and a peripheral edge 18. The plate 12 has at least one mounting opening 20 extending therethrough. The peripheral edge 18 includes a top edge 22, a bottom edge 24, a first lateral edge 26 and a second lateral edge 28.

A flange 30 is attached to and is coextensive with the peripheral edge 18. The flange 30 is angled with respect to a plane of the plate 12. An angle formed by the flange 30 and the first side 14 is between 120 degrees and 160 degrees. The flange 30 has an outer edge 32 having a notch 34 therein. The notch 34 extends toward the peripheral edge 18 of the plate 12. The notch 34 is positioned adjacent to the bottom edge 24 and the notch 34 is located nearer to the first lateral edge 26 than the second lateral edge 28. The first side 14 of the plate 12 has a trough 36 therein aligned with the notch 34. A ridge 38 is formed in the second side 16 of plate 12 to accommodate the trough 36. The trough 36 is elongated and is orientated approximately perpendicular to the bottom edge 24. The coaxial cable 70 is positionable in the notch 34 and extended along a portion of the trough 36.

A saddle 40 is attached to the first side 14 and is configured to releasably secure the coaxial cable 70 in the trough 36. The saddle 40 comprises a pair of walls 42. Each of the walls 42 extends along one of a pair of opposite edges 44 of the trough 36. The walls 42 are arcuate and arc toward each other. Each of the walls 42 has a distal edge 46 positioned opposite of the first side 14 of the plate 12. An area between the distal edges 46 of the walls 42 defines a coaxial cable receiving space.

In use, at least one fastener 48 is extendable through the at least one mounting opening 20 and the plate 12 positioned over a conventional coaxial cable outlet to hold the coaxial cable 70 flush with a dwelling wall 72. The plate 12 may include a second mounting opening 20 and a second fastener 48. The coaxial cable 70 will be held by the trough 36 and the saddle 40 and will prevent the coaxial cable 70 from being caught on or interfering with any objects adjacently positioned with the coaxial cable 70.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A coaxial cable outlet covering system comprising:
   a coaxial cable outlet;
   a coaxial cable extending from said outlet;

a plate having a first side, a second side and a peripheral edge, said plate having at least one mounting opening extending therethrough;

a flange being attached to and being coextensive with said peripheral edge, said flange being angled with respect to a plane of said plate, said flange having an outer edge having a notch therein, said notch extending toward said peripheral edge of said plate, said first side of said plate having a trough therein aligned with said notch, a ridge being formed in said second side of plate to accommodate said trough, said trough being elongated, the coaxial cable being positionable in said notch and extended along a portion of said trough;

a saddle being attached to said first side and releasably securing the coaxial cable in said trough; and at least one fastener extended through said at least one mounting opening and said plate positioned over the outlet to hold the coaxial cable flush with a dwelling wall, said plate covering and hiding from view the outlet and the coaxial cable connection into the outlet.

2. The apparatus according to claim 1, wherein said peripheral edge includes a top edge, a bottom edge, a first lateral edge and a second lateral edge, said notch being positioned adjacent to said bottom edge, said notch being located nearer to said first lateral edge than said second lateral edge, said trough being orientated approximately perpendicular to said bottom edge.

3. The apparatus according to claim 1, wherein an angle formed by said flange and said first side is between 120 degrees and 160 degrees.

4. The apparatus according to claim 1, wherein said saddle comprises a pair of walls, each of said walls extending along one of a pair of opposite edges of said trough, each of said walls being arcuate and arcing toward each other, each of said walls having a distal edge positioned opposite of said first side of said plate, an area between said distal edges of said walls defining a coaxial cable receiving space, said saddle being spaced from said outer edge of said flange.

5. A coaxial cable outlet covering system comprising:

a coaxial cable outlet;

a coaxial cable extending from said outlet;

a plate having a first side, a second side and a peripheral edge, said plate having at least one mounting opening extending therethrough, said peripheral edge including a top edge, a bottom edge, a first lateral edge and a second lateral edge;

a flange being attached to and being coextensive with said peripheral edge, said flange being angled with respect to a plane of said plate, an angle formed by said flange and said first side being between 120 degrees and 160 degrees, said flange having an outer edge having a notch therein, said notch extending toward said peripheral edge of said plate, said notch being positioned adjacent to said bottom edge, said notch being located nearer to said first lateral edge than said second lateral edge, said first side of said plate having a trough therein aligned with said notch, a ridge being formed in said second side of plate to accommodate said trough, said trough being elongated and being orientated approximately perpendicular to said bottom edge, the coaxial cable being positionable in said notch and extended along a portion of said trough;

a saddle being attached to said first side and releasably securing the coaxial cable in said trough, said saddle comprising a pair of aligned walls each extending away from said first side of said plate, said saddle being spaced from said peripheral edge of said plate, each of said walls extending along one of a pair of opposite edges of said trough, each of said walls being arcuate and arcing toward each other, each of said walls having a distal edge positioned opposite of said first side of said plate, an area between said distal edges of said walls defining a coaxial cable receiving space, said saddle being spaced from said outer edge of said flange; and at least one fastener extended through said at least one mounting opening and said plate positioned over the outlet to hold the coaxial cable flush with a dwelling wall, said plate covering and hiding from view the outlet and the coaxial cable connection into the outlet.

* * * * *